Dec. 14, 1948.　　　O. G. CRAVER, SR　　　2,456,389
LAWN MOWER SHARPENER
Filed Jan. 31, 1947　　　　　　　　　　　　2 Sheets-Sheet 2

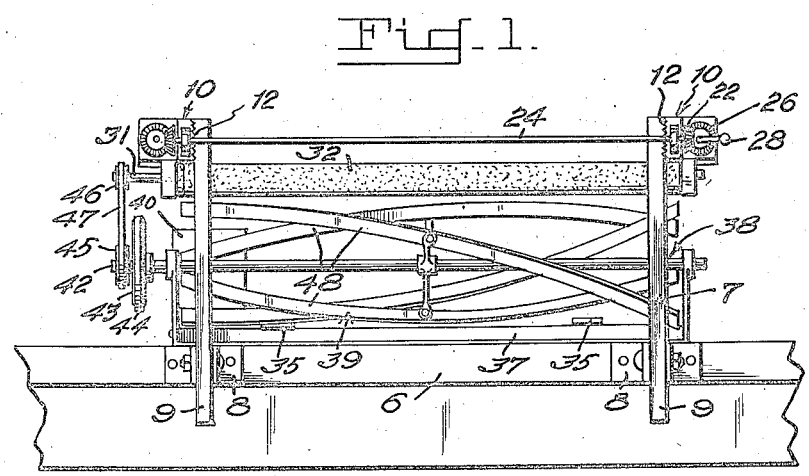
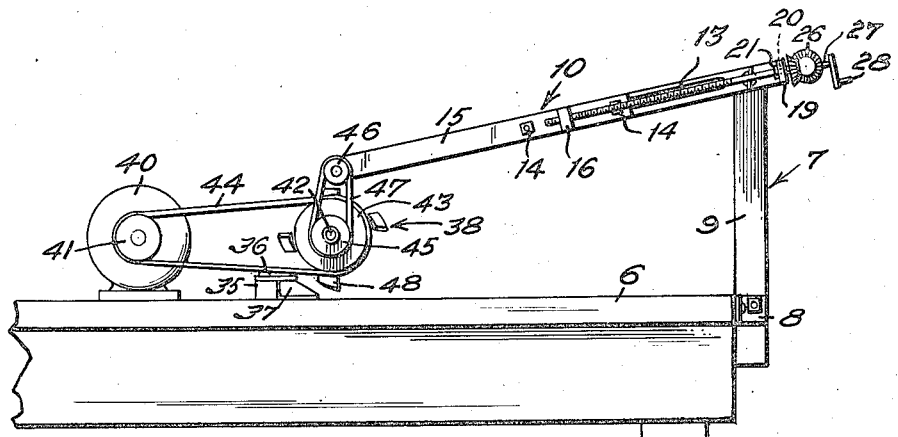
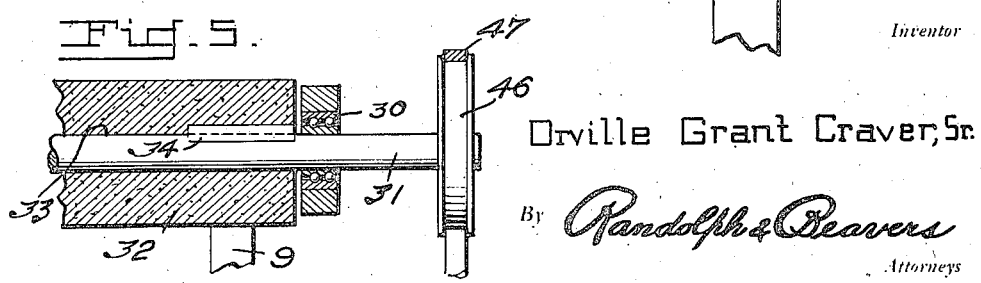

Inventor

Orville Grant Craver Sr.

By Randolph & Beavers
Attorneys

Patented Dec. 14, 1948

2,456,389

UNITED STATES PATENT OFFICE 2,456,389

LAWN MOWER SHARPENER

Orville Grant Craver, Sr., Chester, S. C.

Application January 31, 1947, Serial No. 725,428

7 Claims. (Cl. 51—105)

1

This invention relates to a power actuated lawn mower sharpener especially adapted for use in sharpening the blades of a reel type lawn mower and by means of which the rotatable blades may be sharpened to a uniform depth and bevel for uniformly cooperating with the fixed cutter blade of the mower.

More particularly, it is an object of the invention to provide a lawn mower sharpener including driving means for revolving the reel of the lawn mower for moving the rotary cutter blades of the reel into and out of engagement with a sharpening stone and by which the blades will be uniformly sharpened.

Still another object of the invention is to provide a sharpener including a driving connection from a prime mover to the lawn mower reel and to the sharpening stone, whereby the stone or other sharpening element will be revolved simultaneously with the reel for insuring a uniform wearing of the stone and accordingly a uniform sharpening of the blades.

Still another object of the invention is to provide means for adjustably positioning the sharpening stone and by means of which both ends of the stone are adjusted uniformly for accurately positioning the stone or other sharpening element relatively to the reel blades.

Still another aim of the invention is to provide a sharpener for a lawn mower of extremely simple construction, capable of being economically manufactured and sold and which may be manipulated and adjusted with accuracy by an unskilled operator for insuring an accuracy in the sharpening of the rotary blades of a lawn mower.

Various other objects and advantages of the invention will hereinafter become more fully apparent from the following description of the drawings, illustrating a preferred embodiment thereof, and wherein:

Figure 1 is an end view in elevation looking toward the outer end of the sharpener and showing it in an operative position for sharpening the blades of a reel type lawn mower;

Figure 2 is a side elevational view thereof looking from left to right in Figure 1;

Figure 5 is an enlarged transverse sectional view taken substantially along a plane as indicated by the line 5—5 of Figure 3.

Referring more specifically to the drawings, the numeral 6 designates a portion of a table top or bench or may constitute a separate base of the sharpener, designated generally 7 and comprising the invention.

Figure 3:
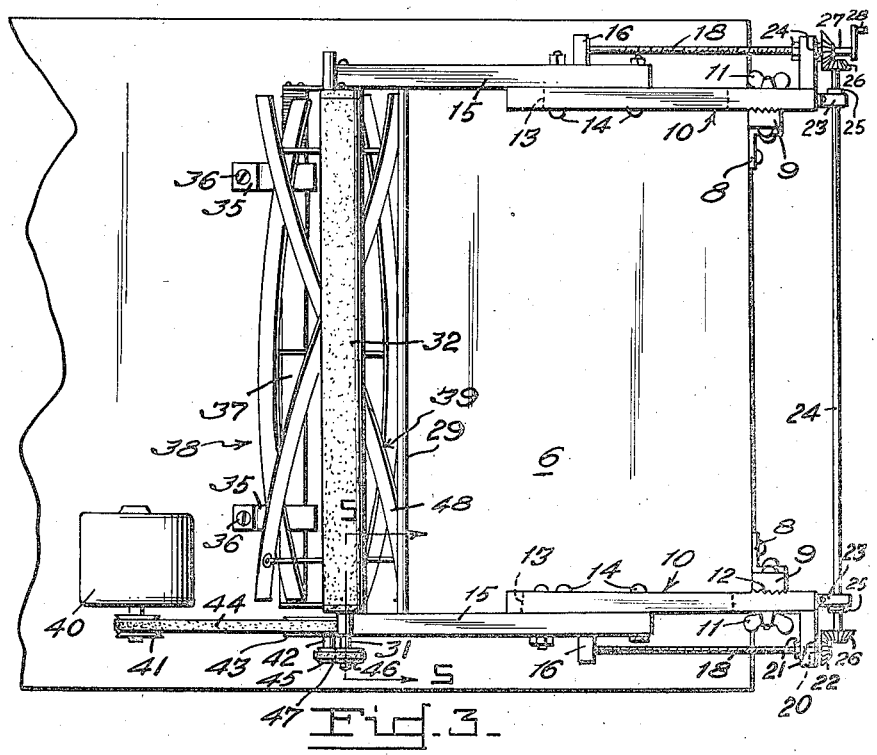
Figure 3 is a top plan view of the sharpener.
Figure 4:
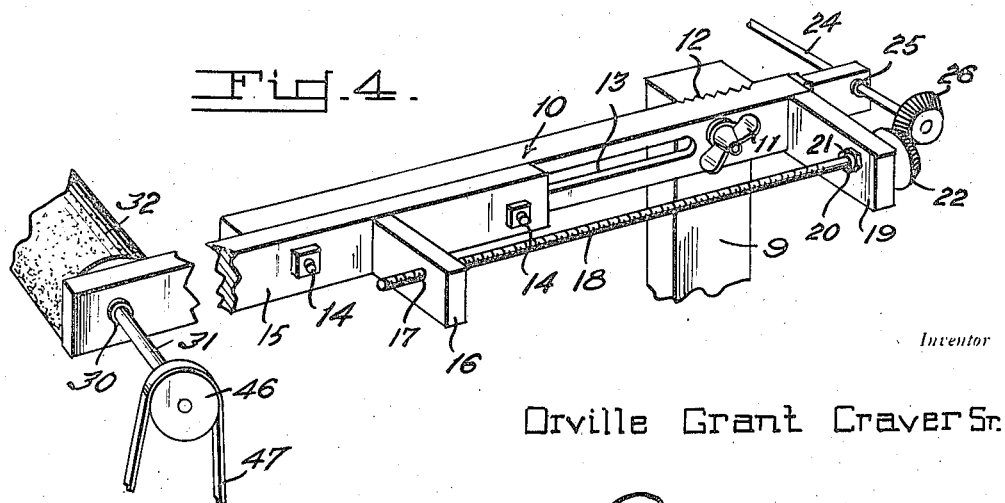
Figure 4 is an enlarged fragmentary perspective view of a portion of the sharpener.

As best seen in Figure 1, one end of the base 6 is provided with a pair of brackets 8 which are secured thereto in spaced relationship and each of which brackets 8 connects an upright supporting arm 9 to the base 6. A cross arm 10, as best seen in Figures 3 and 4, is connected to the upper end and outer side of each supporting arm 9 by a nut and wing bolt fastening 11 and the abutting face portions of the uprights 9 and supporting arms 10 are serrated, as seen at 12 to insure the retention of the supporting arms 10 in adjusted positions relatively to the uprights 9 when the nut and wing bolt fastenings 11 are tightened. The supporting arms 10 are provided with longitudinally extending laterally disposed slots 13 each of which is adapted to slidably receive the shanks of a plurality of headed nut and bolt fastenings 14 which slidably engage the slots 13 and which extend through and are secured to supporting arms 15, one of which supporting arms 15 is mounted partially in overlapping relationship to each supporting arm 10 and on the outer side thereof. It will thus be readily apparent that the supporting arms 15 form extensions of the arms 10 and are slidably connected thereto by the slots 13 and fastenings 14 to enable the arms 15 to be extended or retracted relatively to the arms 10.

The arms 15 are each provided with an outwardly projecting bracket arm 16 having a threaded bore 17 extending transversely therethrough for threadedly engaging a feed screw 18 which is associated with each support 10, 15. The supporting arms 10 are each provided with a bearing arm 19 which projects outwardly therefrom on the opposite side of the fastening 11 to the arm 15 thereof and which is provided with a bearing opening 20 which aligns with the threaded bore 17 on the associated supporting arm 15 and for receiving a portion of the unthreaded, opposite end of feed screw 18 thereof. Retaining collars 21 are carried by each feed screw 18 on opposite sides of its bearing arm 19 to prevent any reciprocation of the feed screw relatively to said bearing arm. A bevel gear 22 is keyed to the terminal of the unthreaded end of each feed screw 18 and said bevel gears are disposed on the outer sides of the bearing arms 19.

The supporting arms 10, at the ends thereof remote to the arms 15, are provided with bearings 23 which project longitudinally from said ends for journaling a shaft 24 which is disposed transversely to the supports 10, 15. The shaft 24 carries retaining collars 25 which bear against the outer sides of the bearings 23 to prevent reciprocatory movement of shaft 24 relatively to said bearings. A bevel gear 26 is keyed to each end of the shaft 24 and said bevel gears 26 mesh with the adjacent bevel gears 22. Either of the feed screws 18 may be provided with an extension 27 which extends from the bevel gear 22 thereof and to which is connected a crank 28, by means of which said feed screw 18 may be revolved for revolving the other feed screw 18 and shaft 24 through the bevel gears 22 and 26 so that the arms 15 will be simultaneously extended or retracted relatively to the arms 10 and to uniform distances.

The arms 15, outwardly of the supporting arms 10, are connected by a cross brace 29 and therebeyond are provided with transversely disposed aligned bearings 30 for journaling a shaft 31 which extends therebetween. A sharpening stone 32 of substantially circular cross section is provided with a central bore 33 extending longitudinally therethrough and through which the shaft 31 extends for mounting the stone 32 between the bearings 30. The stone 32 is connected for rotation with the shaft 31 by means of one or a plurality of keys or splines 34, as seen in Figure 5.

The supports 10, 15 extend from the uprights 9 inwardly with respect to the base 6 and are disposed thereover and normally are inclined downwardly and toward the base 6. Beyond and beneath the sharpening stone 32, a pair of clamps 35 are detachably secured by fastenings 36 to the upper side of the base 6 and are adapted to detachably engage and clamp the stationary cutter blade 37 of a lawn mower 38 for positioning the reel 39 thereof above the base 6 and beneath the sharpening stone 32.

An electric motor 40 is fastened to the upper side of the base 6 behind the clamps 35 and is provided with a driven shaft having a belt pulley 41 keyed thereto. One of the ground wheels of the lawn mower 38 is removed from the axle 42 thereof and is replaced by a belt pulley 43 which aligns with the belt pulley 41 and over which an endless belt 44 is trained for revolving the reel 39 from the motor 40. A second belt pulley 45 is keyed to the axle 42, outwardly of the belt pulley 43 and beneath a belt pulley 46 which is keyed to one end of the shaft 31. An endless belt 47 is trained over the pulleys 45 and 46 for rotating the sharpener stone 32 in the same direction that the reel 39 is revolved.

From the foregoing, it will be readily apparent that the nut and wing bolt fastenings 11 may be loosened for adjusting the supports 10, 15 relatively to the uprights 9 so that the under side of the stone 32 will be disposed substantially at the level of the top of the reel 39 or slightly therebeneath. The crank 28 can then be actuated for extending or retracting the supporting arms 15 relatively to the arms 10 for positioning the periphery of the stone 32 in engagement with the cutting edge of one of the rotary cutter blades 48 of the reel 39. The motor 40 is then actuated to drive the pulleys 41, 43, 45 and 46, the belts 44 and 47 and the reel 39 and sharpening stone 32 in a counterclockwise direction, as seen in Figure 2, or in the opposite direction to the direction that the reel 39 will revolve in the normal operation of the lawn mower 38. As the reel 39 is thus revolved, the outer cutting edges of its blades 48 will move into and out of engagement with the rotating sharpening stone 32, which is of sufficient length to engage said blades from end to end thereof, for uniformly grinding and beveling the cutting edges of the blades 48 for sharpening said blades to uniform dimensions relatively to the reel 39 so that the cutting edges of all of the blades 48 will coact uniformly with the cutting edge of the stationary blade 37 when the lawn mower 38 is thereafter used in a conventional manner. It will be readily obvious that the sharpening stone 32 by being disposed slightly in front of the vertical center of the reel 39, may be advanced toward said reel by operation of the crank 28 and during the sharpening operation to insure that all portions of all of the cutting edges of the blades 48 are engaged and sharpened by the stone 32 and to uniform dimensions.

Various modifications and changes are contemplated and may obviously be resorted to, without departing from the spirit and scope of the invention as hereinafter defined by the appended claims.

I claim:

1. In a sharpener for reel type lawn mowers, a supporting base, means for detachably supporting a reel type lawn mower thereon, driving means partially supported by said base and adapted to be connected to the lawn mower axle for revolving the lawn mower reel, a pair of uprights connected to and extending upwardly from said base, supporting members projecting from said uprights and in a direction toward the reel, and a sharpening stone disposed between the free ends of said supporting members and positioned to engage and sharpen the cutting edges of the rotary blades of the reel, when said reel is revolved, and means for extending and retracting said supporting members for adjustably moving the sharpening stone toward and away from the rotary blades.

2. In a sharpener for reel type lawn mowers, a supporting base, means for detachably supporting a reel type lawn mower thereon, driving means partially supported by said base and adapted to be connected to the lawn mower axle for revolving the lawn mower reel, a pair of uprights connected to and extending upwardly from said base, supporting members projecting from said uprights and in a direction toward the reel, and a sharpening stone disposed between the free ends of said supporting members and positioned to engage and sharpen the cutting edges of the rotary blades of the reel, when said reel is revolved, each of said supporting members being formed of extensible sections, and manually actuated means for simultaneously and uniformly adjusting the extensible sections of the supporting members for adjustably positioning the sharpening stone relatively to the rotary blades.

3. In a sharpener for reel type lawn mowers, a supporting base, means for detachably supporting a reel type lawn mower thereon, driving means partially supported by said base and adapted to be connected to the lawn mower axle for revolving the lawn mower reel, a pair of uprights connected to and extending upwardly from said base, supporting members projecting from said uprights and in a direction toward the reel, and a sharpening stone disposed between the free ends of said supporting members and positioned to engage and sharpen the cutting edges of the rotary blades of the reel, when said reel is revolved, and means for angularly adjusting said supporting members relatively to the uprights for adjustably positioning the sharpening stone relatively to the cutting edges of the rotary blades, each of said supporting members being formed of extensible sections, and manually actuated means for simultaneously and uniformly adjusting the extensible sections of the supporting members for adjustably positioning the sharpening stone relatively to the rotary blades.

4. In a sharpener for reel type lawn mowers, a supporting base, means for detachably supporting a reel type lawn mower thereon, driving means partially supported by said base and adapted to be connected to the lawn mower axle for revolving the lawn mower reel, a pair of uprights connected to and extending upwardly from said base, supporting members projecting from said uprights and in a direction toward the reel, and a sharpening stone disposed between the free ends of said supporting members and positioned to engage and sharpen the cutting edges of the rotary blades of the reel, when said reel is revolved, and means for angularly adjusting said supporting members relatively to the uprights for adjustably positioning the sharpening stone relatively to the cutting edges of the rotary blades, each of said supporting members being formed of extensible sections, and manually actuated means for simultaneously and uniformly adjusting the extensible sections of the supporting members for adjustably positioning the sharpening stone relatively to the rotary blades, said last mentioned means comprising feed screws for extending and retracting the extensible sections of each of the supporting members, a transversely disposed shaft journaled by said supporting members, bevel gears connecting the ends of the transversely disposed shaft to corresponding ends of the feed screws, and a manually actuated crank for simultaneously rotating the feed screws and transversely disposed shaft.

5. In a sharpener for reel type lawn mowers, a supporting base, means for detachably supporting a reel type lawn mower thereon, driving means partially supported by said base and adapted to be connected to the lawn mower axle for revolving the lawn mower reel, a pair of uprights connected to and extending upwardly from said base, supporting members projecting from said uprights and in a direction toward the reel, and a sharpening stone disposed between the free ends of said supporting members and positioned to engage and sharpen the cutting edges of the rotary blades of the reel, when said reel is revolved, said sharpening stone having a shaft extending longitudinally therethrough and keyed thereto, said sharpening stone being substantially circular in cross section, the sharpening stone shaft being journaled in said supporting members and having a belt pulley on one end thereof, a belt pulley keyed to one end of the reel axle, a belt connecting said belt pulleys for causing the sharpening stone to be revolved simultaneously with and in the same direction as the lawn mower reel.

6. A lawn mower sharpener as in claim 5, said supporting member being formed of extensible sections and being provided with feed screws for extending and retracting the extensible sections of each of the supporting members, a transversely disposed shaft journaled by said supporting members, bevel gears connecting the ends of the transversely disposed shaft to corresponding ends of the feed screws, and a manually actuated crank for simultaneously rotating the feed screws and transversely disposed shaft.

7. A lawn mower sharpener as in claim 5, said supporting member being formed of extensible sections and being provided with feed screws for extending and retracting the extensible sections of each of the supporting members, a transversely disposed shaft journaled by said supporting members, bevel gears connecting the ends of the transversely disposed shaft to corresponding ends of the feed screws, and a manually actuated crank for simultaneously rotating the feed screws and transversely disposed shaft, said sharpening stone being of a length equal to or greater than the length of said rotary blades.

ORVILLE GRANT CRAVER, Sr.

REFERENCES CITED

The following references are of record in the file of this patent:

UNITED STATES PATENTS

| Number | Name | Date |
|---|---|---|
| 556,868 | Schureman | Mar. 24, 1896 |
| 1,389,588 | Klay | Sept. 6, 1921 |
| 1,866,794 | Bierman | July 12, 1932 |